United States Patent [19]

Eich et al.

[11] 3,896,938

[45] July 29, 1975

[54] DEVICE FOR COMPENSATING CARRIAGE WEIGHT ON GANTRY OR CANTILEVERED MACHINE TOOLS

[75] Inventors: Edmund Eich; Gunter Briesofsky, both of Coburg, Germany

[73] Assignee: Werkzeugmaschinenfabrik Adolf Waldrich Coburg, Coburg, Germany

[22] Filed: Feb. 1, 1973

[21] Appl. No.: 328,863

[30] Foreign Application Priority Data

Feb. 11, 1972 Germany............................ 2206641

[52] U.S. Cl................................... 212/26; 254/172
[51] Int. Cl........................................... B66c 19/00
[58] Field of Search ............ 212/14, 10, 26, 11, 32, 212/13, 15; 187/94; 254/129, 172

[56] References Cited
UNITED STATES PATENTS

| | | | |
|---|---|---|---|
| 1,141,964 | 6/1915 | John .................................... | 187/94 |
| 3,161,022 | 12/1964 | Sandoy ............................... | 254/172 |
| 3,517,830 | 6/1970 | Virkkala ............................... | 212/10 |

Primary Examiner—Robert J. Spar
Assistant Examiner—Lawrence J. Oresky
Attorney, Agent, or Firm—Woodhams, Blanchard and Flynn

[57] ABSTRACT

A weight compensating device especially for machine tools. In order to support the weight of a device, such as a machine tool, carried on a gantry or cantilevered beam and thereby to prevent vertical deflection of the supporting means and consequent vertical change in positioning of the device, there is provided supporting means above such device and arranged for providing a constant upward force on such device sufficient to compensate for the weight thereof. In the present embodiment of the invention, such supporting means comprises a trolley supported above the device and arranged for traveling therewith so as always to be in a position substantially vertically thereabove. A cable extends from the device to and around a drum supported on said trolley and hydraulically actuated means are provided for imposing a constant torque continuously on the said drum in a cable lifting direction.

4 Claims, 1 Drawing Figure

PATENTED JUL 29 1975 3,896,938
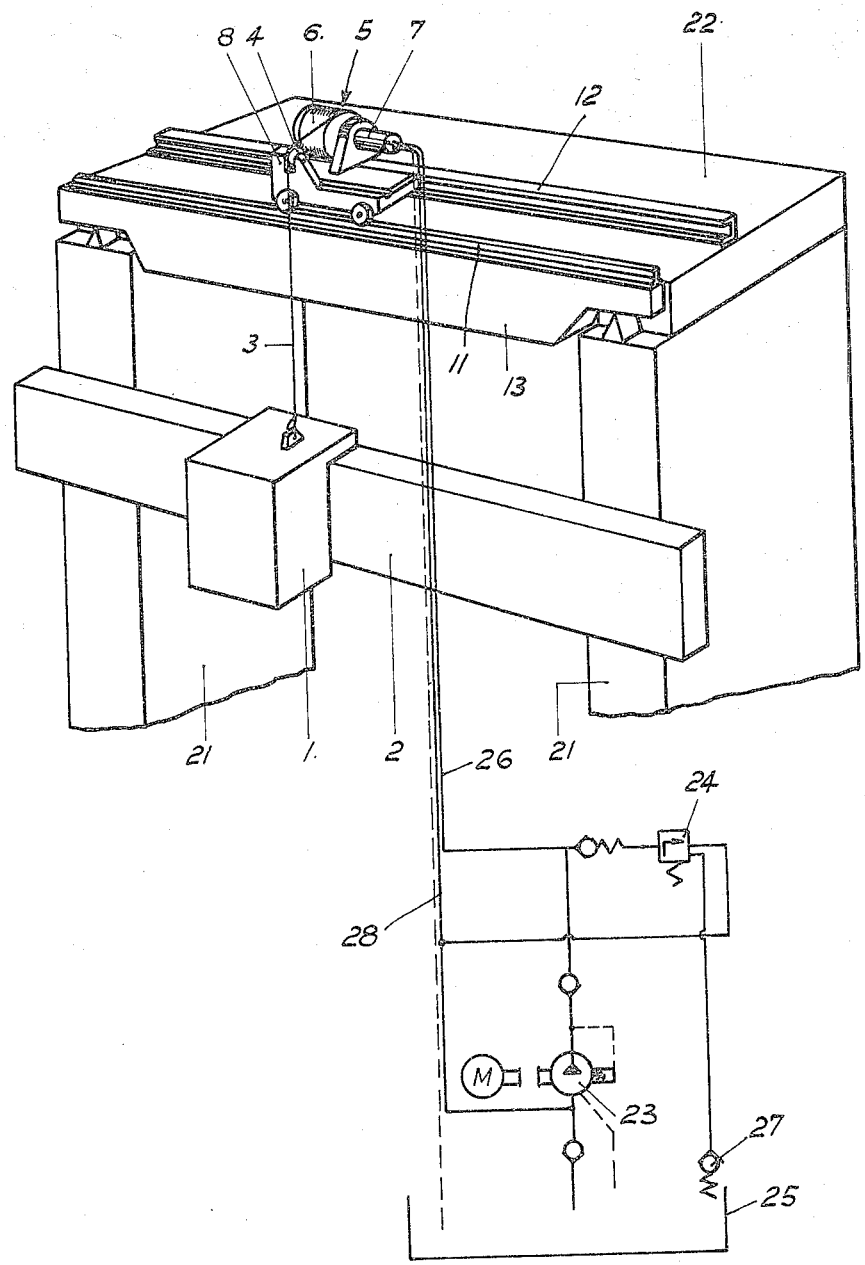

DEVICE FOR COMPENSATING CARRIAGE WEIGHT ON GANTRY OR CANTILEVERED MACHINE TOOLS

FIELD OF THE INVENTION

The invention relates to a device for compensating the carriage weight on gantry or cantilevered machine tools in which the carriage is suspended on a cable which is in turn supported on a trolley which is movable above the transverse beam on a stationarily arranged cross member, for example a cross beam, parallel to the transverse beam and which is driven synchronously with the carriage, and in which the cable is under constant tension.

BACKGROUND OF THE INVENTION

The transverse beam of a machine tool is moved by the weight of the carriage or the carriages in differing amounts depending on the position of the carriage. It is therefore necessary to compensate for the carriage weight by vertical pull upwardly.

To achieve this in one device of the above-mentioned type, the cable is guided over movable rollers which are mounted on the trolley and counterweights are provided at the end of the cable. However, for reasons of construction the cable cannot run in a single plane so that many guide rollers are needed. Therefore in the case of two or more carriages, considerable space difficulties occur, particularly since at greater carriage weights the counterweights must be constructed correspondingly large and heavy.

Therefore a different device is also known in which the trolley is guided on an auxiliary carrier beam which is supported with its two ends near the ends of the transverse beam. Tension springs are provided between the trolley and the carriage. This solution has also various disadvantages. If the transverse beam is adjusted in height by elevating screws, then depending on the position of the carriage, different loads are imposed onto the screws. Further, deflections in the screws are not compensated. Also the elevating screws must be constructed particularly strong and are subject to an increased wear because they must absorb, in addition to the weight of the transverse beam and the carriages, the weight of the auxiliary carrier which, in order to avoid bending, must be also constructed particularly strong and accordingly heavy.

The basic purpose of the invention is thus to produce a device of the type mentioned above, which permits as much as possible an exact compensation of the carriage weight but is built for minimum space requirement and is inexpensive to manufacture.

This is achieved according to the invention by providing a winch mechanism on the trolley and by driving the winch mechanism by a hydraulic motor which continuously exerts a constant torque onto a cable drum. A hydraulic pump is provided for driving the motor and an adjustable pressure limiting valve is provided between the pump and the motor for maintaining constant the pressure on the feed line and thereby on the pump. This arrangement eliminates the counterweights. The entire device can be mounted on a relatively small trolley whereby even the compensation of the weight of several carriages does not present difficulties because several trolleys can be arranged side-by-side. Also the inventive device can be used in the carriage of a milling machine in order to compensate for its weight and to therewith avoid the torsion load on the transverse beam. By maintaining a constant pressure in the feed line to the motor a constant torque is produced by the motor. This constant torque corresponds to a certain pull in the cable. The torque is preferably so adjusted that the pull in the cable is slightly greater than the weight of the carriage. The inventive device is distinguished also by simplicity in structure, both in mechanical aspect and also with respect to the hydraulic control. It is possible to use for the hydraulic drive substantially commercial parts like motor, pump and pressure limiting valves.

In an advantageous further development of the invention, the pump is constructed as a pressure-compensated pump, the output of which upon achieving a selected pressure is regulated to zero. This avoids unnecessary energy consumption and a heating of the hydraulic medium.

Further advantages and details of the invention will be discussed more in detail hereinafter in connection with one exemplary embodiment which is illustrated in the drawing.

BRIEF DESCRIPTION OF THE DRAWING

The drawing shows a diagrammatic schematic illustration of the subject matter of the invention.

DETAILED DESCRIPTION

In the drawing, 1 identifies a carriage which is movably guided on the transverse beam 2. For the weight compensation, a cable 3 is secured on the carriage 1 along its centroidal axis. The cable is guided over a guide roller 4 to the drum 6 of a winch mechanism 5 which is arranged on the trolley 8. The trolley itself is movably guided by a rail 11 on the auxiliary support 13 and a further rail 12 on the cross head 22 in a direction parallel to the transverse beam 2. The cross head 22 and the auxiliary support 13 are supported by and extend between a pair of horizontally spaced uprights 21. The trolley itself is driven by a not illustrated, and conventional motor and a control mechanism which effects suitable driving of the trolley 8 in response to respective lateral deflection of the cable 3.

In order to effect the desired compensation of the carriage weight, it is required that the cable be under a constant tension. For this purpose a hydraulic motor 7 is provided for for driving the cable drum 6, which hydraulic motor is under a constant pressure. The hydraulic motor thus exerts a constant torque onto the cable drum 6.

A pump 23 is provided for driving the motor 7, which pump is advantageously constructed as a pressure compensated pump. The pump 23 is connected through the feed line 26 to the motor. A discharge line 28 leads back to the inlet side of the pump 23. An adjustable pressure limiting valve 24 is further provided in the feed line 26, the outflow side of which pressure limiting valve is connected both to the discharge line 28 and through a spring-loaded check valve 27 to the reservoir 25.

The pump 23 is continuously driven but its volume output upon reaching a selected pressure is automatically regulated to zero. Either through the adjustment of the pump 23 or also through the pressure limiting valve 24, or both, there is imposed a constant pressure in the feed line 26. Thus, the motor 7 produces a constant torque. Upon the occurrence of an upward movement of the transverse beam 2, the pressure in the line 26 will drop. However, the pressure compensating pump regulates automatically its volume output until it reaches the selected pressure. If the transverse beam is motionless, the output of the pump 23 is again regulated to zero and excess oil flows through the pressure limiting valve 24 into the reservoir 25.

During downward movement of the transverse beam 2, the cable drum 6 is driven by the unwinding cable 3 and itself drives the hydraulic motor 7. Same acts thus as a pump and pumps hydraulic oil through the feed line 26. This oil flows through the pressure limiting valve 24 partly back into the line 28 which serves as a discharge line during upward movement and partly into the reservoir 25. Thus it is not necessary to reverse the pump 23.

The hydraulic motor 7 is advantageously constructed as a so-called hydrostatic high moment motor which can run very slowly but which can react quickly to develop a high output torque.

The embodiments of the invention for which an exclusive property or privilege is claimed are defined as follows:

1. A device for compensating for the weight of a carriage movably mounted on a transverse beam mounted on and extending between a pair of horizontally spaced uprights to maintain said transverse beam and said carriage at a predefined vertical level, comprising:

stationary support means mounted on and extending between said pair of uprights parallel to said transverse beam;

trolley means mounted on said support means for movement back and forth parallel to said transverse beam in synchronism with said carriage;

cable means and winch means therefor mounted on said trolley means, said cable means being secured to and extending between said winch means and said carriage and is always under a constant tension force;

hydraulic motor means drivingly connected to said winch means;

hydraulic pump means connected in fluid circuit to said hydraulic motor means for supplying pressurized hydraulic fluid to said hydraulic motor means; and adjustable pressure controlling means connected in fluid circuit to said fluid circuit between said hydraulic pump means and said hydraulic motor means to maintain a constant pressure in said fluid circuit and thence on said hydraulic motor means, whereby said constant pressure on said hydraulic motor means effects a constant torque on said winch means and, consequently, said cable means, said hydraulic motor means also defining a sensing means for sensing rotational movement of said winch means occurring when said transverse beam is moved from said predefined vertical level and producing a fluid flow signal, said adjustable pressure controlling means controlling said pressure in response to said fluid flow signal, whereby said carriage will be maintained at said predefined vertical level as said trolley means and said carriage move between said uprights.

2. A device according to claim 1, wherein said hydraulic pump means is a pressure-compensated pump, the volume output of which is regulated to zero upon reaching a selected pressure determined by said adjustable pressure controlling means.

3. A device according to claim 1, wherein said hydraulic motor means has the characteristic of developing a high output torque at low rotational speeds.

4. A device according to claim 1, wherein said hydraulic pump means is driven continuously to continuously apply a constant pressure to said hydraulic motor means.

* * * * *